US011169502B2

(12) United States Patent
Xia

(10) Patent No.: US 11,169,502 B2
(45) Date of Patent: Nov. 9, 2021

(54) LIFE ESTIMATION DEVICE AND MACHINE LEARNING DEVICE

(71) Applicant: FANUC CORPORATION, Yamanashi (JP)

(72) Inventor: Zhizhen Xia, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 217 days.

(21) Appl. No.: 16/162,400

(22) Filed: Oct. 17, 2018

(65) Prior Publication Data
US 2019/0121319 A1 Apr. 25, 2019

(30) Foreign Application Priority Data

Oct. 23, 2017 (JP) .............................. JP2017-204221

(51) Int. Cl.
G05B 19/4065 (2006.01)
G06N 3/08 (2006.01)
G06N 20/00 (2019.01)
G05B 19/4069 (2006.01)
G05B 23/02 (2006.01)

(52) U.S. Cl.
CPC ..... *G05B 19/4065* (2013.01); *G05B 19/4069* (2013.01); *G05B 23/024* (2013.01); *G05B 23/0283* (2013.01); *G06N 3/08* (2013.01); *G06N 20/00* (2019.01); *G05B 2219/37252* (2013.01);

(Continued)

(58) Field of Classification Search
None
See application file for complete search history.

(56) References Cited

U.S. PATENT DOCUMENTS

2001/0048858 A1* 12/2001 Akamatsu .......... G05B 19/4065
409/134
2002/0013639 A1* 1/2002 Fujishima .............. B23Q 41/08
700/175

(Continued)

FOREIGN PATENT DOCUMENTS

JP 2016-20008 A 2/2016
JP 2016-38657 A 3/2016

(Continued)

OTHER PUBLICATIONS

Tian, Z., "An artificial neural network method for remaining useful life prediction of equipment subject to condition monitoring," J. Intell. Manuf., vol. 23 (2012) pp. 227-237. (Year: 2012).*

(Continued)

*Primary Examiner* — Brian M Smith
(74) *Attorney, Agent, or Firm* — Hauptman Ham, LLP

(57) ABSTRACT

A device that estimates a life of a clamping mechanism clamping rotation of a rotary table includes a machine learning device. The machine learning device observes operating state data of the rotary table and operation history data of the rotary table as a state variable indicative of a current state of an environment, and acquires life data indicative of the life of the clamping mechanism as label data. In addition, the device uses the state variable that has been observed and the label data that has been acquired and learns the operating state data and the operation history data and the life data in association with each other.

7 Claims, 6 Drawing Sheets

(52) U.S. Cl.
CPC .............. *G05B 2219/42328* (2013.01); *G05B 2219/49123* (2013.01)

(56) References Cited

U.S. PATENT DOCUMENTS

| | | | |
|---|---|---|---|
| 2010/0100338 A1* | 4/2010 | Vik | G01M 5/0033 |
| | | | 702/42 |
| 2015/0379072 A1* | 12/2015 | Dirac | G06N 20/00 |
| | | | 707/693 |
| 2016/0008939 A1 | 1/2016 | Masuya | |
| 2016/0243660 A1* | 8/2016 | Nishimura | B23Q 16/105 |
| 2016/0346956 A1 | 12/2016 | Takekawa et al. | |
| 2018/0373233 A1 | 12/2018 | Goto | |
| 2019/0265657 A1 | 8/2019 | Inagaki et al. | |

FOREIGN PATENT DOCUMENTS

| | | | |
|---|---|---|---|
| JP | 2016-219756 | A | 12/2016 |
| JP | 2017-120649 | A | 7/2017 |
| JP | 2019-8675 | A | 1/2019 |

OTHER PUBLICATIONS

Drouillet, C. et al., "Tool life predictions in milling using spindle power with the neural network technique," Journal of Manufacturing Processes, vol. 22 (2016) pp. 161-168. (Year: 2016).*

Chen, G. et al., "Study on Online Detection and Fault Diagnosis of Band Saw Equipment," Intl. Journal of Control and Automation, vol. 7, No. 8 (2014) pp. 157-172. (Year: 2014).*

Iijima, H. et al., "Condition based renewal and maintenance integrated planning," CIRP Annals—Manufacturing Technology, vol. 65 (2016a) pp. 37-40. (Year: 2016).*

* cited by examiner

LIFE ESTIMATION DEVICE AND MACHINE LEARNING DEVICE

RELATED APPLICATIONS

The present application claims priority of Japanese Patent Application No. 2017-204221, filed on Oct. 23, 2017, the disclosure of which is hereby incorporated by reference herein in its entirety.

BACKGROUND OF THE INVENTION

1. Field of the Invention

The present invention relates to a life estimation device and a machine learning device and in particular to a life estimation device and a machine learning device for estimating a life of a clamping mechanism of a rotary table.

2. Description of the Related Art

In a machine tool that includes a rotary dividing device including a rotary table, a clamping mechanism for holding the rotary table, and a drive motor for driving the rotary table, a workpiece is placed on the rotary table and fixed thereto, and when carrying out machining on the workpiece, the rotary table is driven using the drive motor and adjusted at a predetermined angular position, and the clamping mechanism is driven to clamp the rotary table at the adjusted position. Such a clamping mechanism includes, for example, a brake disc and the clamping operation is realized by pressure contact with the brake disc or the like.

According to the clamping mechanism having the above-described structure, as clamping operations are repeated, wear and degradation occur in the components of the clamping mechanism such as a lid, a piston, a brake disc, and air valve due to various external factors such as processing load acting thereupon while the clamped state is maintained. When wear on the components of the clamping mechanism progresses, the clamping performance decreases, eventually reaching the life of the clamping mechanism. When the clamping mechanism reaches the end of its life, it will not be possible to secure a workpiece at its position in the machining process, so that an abnormal alarm is triggered during rotation operation or machining, and the rotary table or the machine tool becomes unusable. For this reason, it is necessary to properly carry out maintenance of the clamping mechanism before it reaches the end of life by anticipating that the life will in fact be reached.

As a traditional technique for predicting the life of a clamping mechanism, for example, Japanese Patent Application Laid-Open No. 2016-020008 may be mentioned which discloses a technique of computing a disturbance torque acting upon a brake when a rotary table is clamped, obtaining a coefficient corresponding to the calculated disturbance torque, cumulatively computing the coefficient, and reporting the fact that the brake disc has reached its end of life in response to a value obtained by the cumulative computation of the coefficient reaching a preset value.

However, when the life of the clamping mechanism is to be considered, it is necessary to consider not only the wear of the brake disc but also other parts such as the lid, the piston, the air valve, and the like as disclosed in Japanese Patent Application Laid-Open No. 2016-020008. As a result, in order to automatically and accurately determine the life of the clamping mechanism, it is necessary to consider various other external factors. It will be difficult to accurately determine the life merely relying on the coefficient computed from the disturbance torque as described in Japanese Patent Application Laid-open No. 2016-020008.

SUMMARY OF THE INVENTION

It is therefore an object of the present invention to provide a life estimation device and a machine learning device capable of automatically and accurately estimating the life of a clamping mechanism.

In order to solve the above-identified problem, a life estimation device according to the present invention collects pieces of data on weights of jigs and/or workpieces, a clamp/unclamp frequency, a source pressure, a rotary axis speed, a rotary axis load, operating time, and the like by aggregating pieces of data in the operating state of at least one rotary table, and carries out machine learning based on the pieces of data thus collected, and, based on the machine learning, estimates a life of a clamping device of the rotary table.

The life estimation device according to an aspect of the present invention is a life estimation device that estimates a life of a clamping mechanism clamping or unclamping rotation of a rotary table, the device including a machine learning device configured to learn estimation of the life of the clamping mechanism with respect to a state of the rotary table; a state observation unit configured to observe operating state data regarding an operating state of the rotary table and operation history data regarding an operation history of the rotary table as a state variable indicative of a current state of an environment; a label data acquisition unit configured to acquire, as label data, life data indicative of the life of the clamping mechanism; and a learning unit configured to learn the operating state data and the operation history data and the life data in association with each other using the state variable and the label data.

The learning unit may include an error computation unit configured to compute an error between a correlation model estimating the life of the clamping mechanism from the state variable and a correlation feature identified from teacher data prepared in advance, and a model updating unit configured to update the correlation model such that the error is reduced.

The learning unit may carry out an operation on the state variable and the label data in accordance with a multi-layer structure.

The life estimation device may further include an estimation result output unit configured to output a result of estimation of the life of the clamping mechanism on the basis of a result of learning by the learning unit.

The machine learning device may reside in a cloud server.

A machine learning device according to another aspect of the present invention is a machine learning device that learns estimation of a life of a clamping mechanism clamping or unclamping rotation of a rotary table with respect to a state of the rotary table, the device including a state observation unit configured to observe operating state data regarding an operating state of the rotary table and operation history data regarding an operation history of the rotary table as a state variable indicative of a current state of an environment; a label data acquisition unit configured to acquire, as label data, life data indicative of the life of the clamping mechanism; and a learning unit configured to learn the operating state data and the operation history data and the life data in association with each other using the state variable and the label data.

According to the present invention, it is made possible to automatically and accurately estimate the life of the clamping mechanism of the rotary table and avoid the downtime by early repair of the clamping mechanism.

DETAILED DESCRIPTION OF THE PREFERRED EMBODIMENTS

Figure 1:
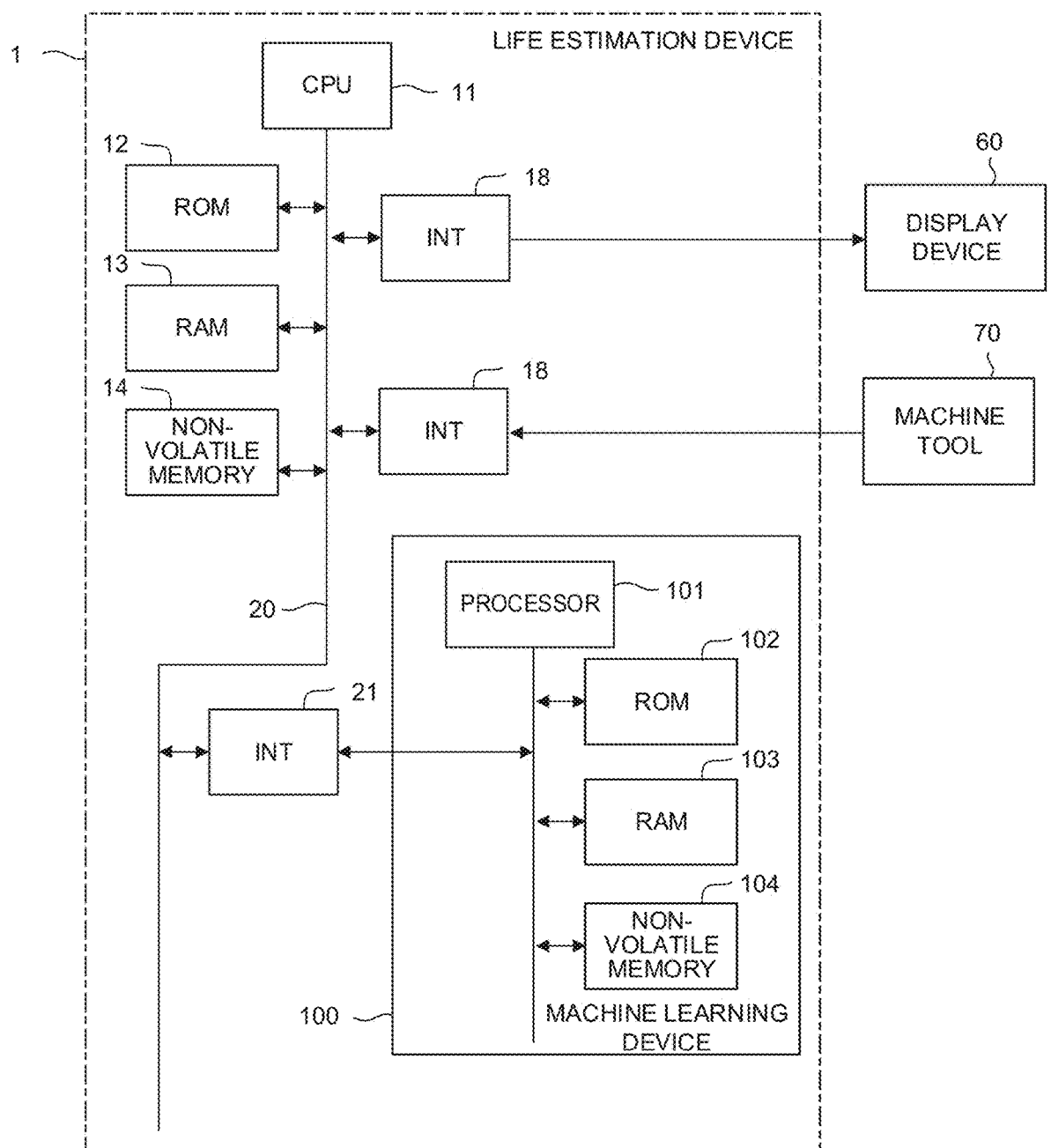
FIG. 1 is a schematic hardware configuration diagram of a life estimation device according to an embodiment.

FIG. 1 is a schematic hardware configuration diagram illustrating a main part of a life estimation device according to a first embodiment.

The life estimation device 1 can be implemented as a controller that controls a machine tool including, for example, a rotary table and can also be implemented as a computer such as a cell computer, host computer, and cloud server connected via a network to a machine tool including a rotary table. A central processing unit (CPU) 11 incorporated in the life estimation device 1 is a processor that controls the life estimation device 1 as a whole and reads a system program stored in a ROM 12 via a bus 20 to control the entire life estimation device 1 in accordance with the system program. Temporary calculation data, various data input by an operator via an input unit (not shown), and the like are temporarily stored in a RAM 13.

A non-volatile memory 14 is configured as a memory that retains a state of storage even when the power of the life estimation device 1 is turned off, for example, by being backed up with a not-shown battery. The non-volatile memory 14 stores various pieces of data input by an operator via an input unit (not shown) and various pieces of data acquired from a machine tool 70 via an interface 19 (including set values for use in control of the operation of the rotary table attached to the machine tool 70, weights of jigs and workpieces, maintenance information of the rotary table, etc.) as well as programs for control that are input via an interface (not shown) and the like. Programs and various pieces of data stored in the non-volatile memory 14 may be deployed in the RAM 13 when they are to be executed and/or used. Further, system programs including a known analysis program for analyzing information related to the operation of the rotary table acquired from the machine tool 70, a system program for controlling interaction with a machine learning device 100 which will be described later, and the like are written in advance in the ROM 12.

Data related to the operation of the rotary table can be acquired from the machine tool 70 via the interface 19. The data related to the operation of the rotary table acquired from the machine tool 70 includes, for example, the number of clamp/unclamp actions instructed by a program or the like, a source pressure of a pump for use in clamping/unclamping the rotary table, a speed of a rotary axis of the rotary table, a load acting on the rotary table, an operating time of the rotary table, and the like.

The interface 21 is an interface for interconnecting the life estimation device 1 and the machine learning device 100. The machine learning device 100 includes a processor 101 that controls the entire machine learning device 100, a ROM 102 that stores system programs and the like, a RAM 103 that performs temporary storage in each process related to machine learning, and a non-volatile memory 104 used for storing a learning model, etc. The machine learning device 100 is configured to be capable of observing various pieces of information that can be acquired by the life estimation device 1 via the interface 21 (including set values used in controlling the operation of the rotary table attached to the machine tool 70, weights of jigs and workpieces, maintenance information of the rotary table, number of clamp/unclamp actions, a source pressure of a pump for use in clamping/unclamping the rotary table, a speed of a rotary axis of the rotary table, a load acting on the rotary table, an operating time of the rotary table, etc.). Further, the life estimation device 1 receives estimation of the life of the clamping mechanism of the rotary table, where the estimation is output from the machine learning device 100, and displays it on a display device 60.

Figure 2:
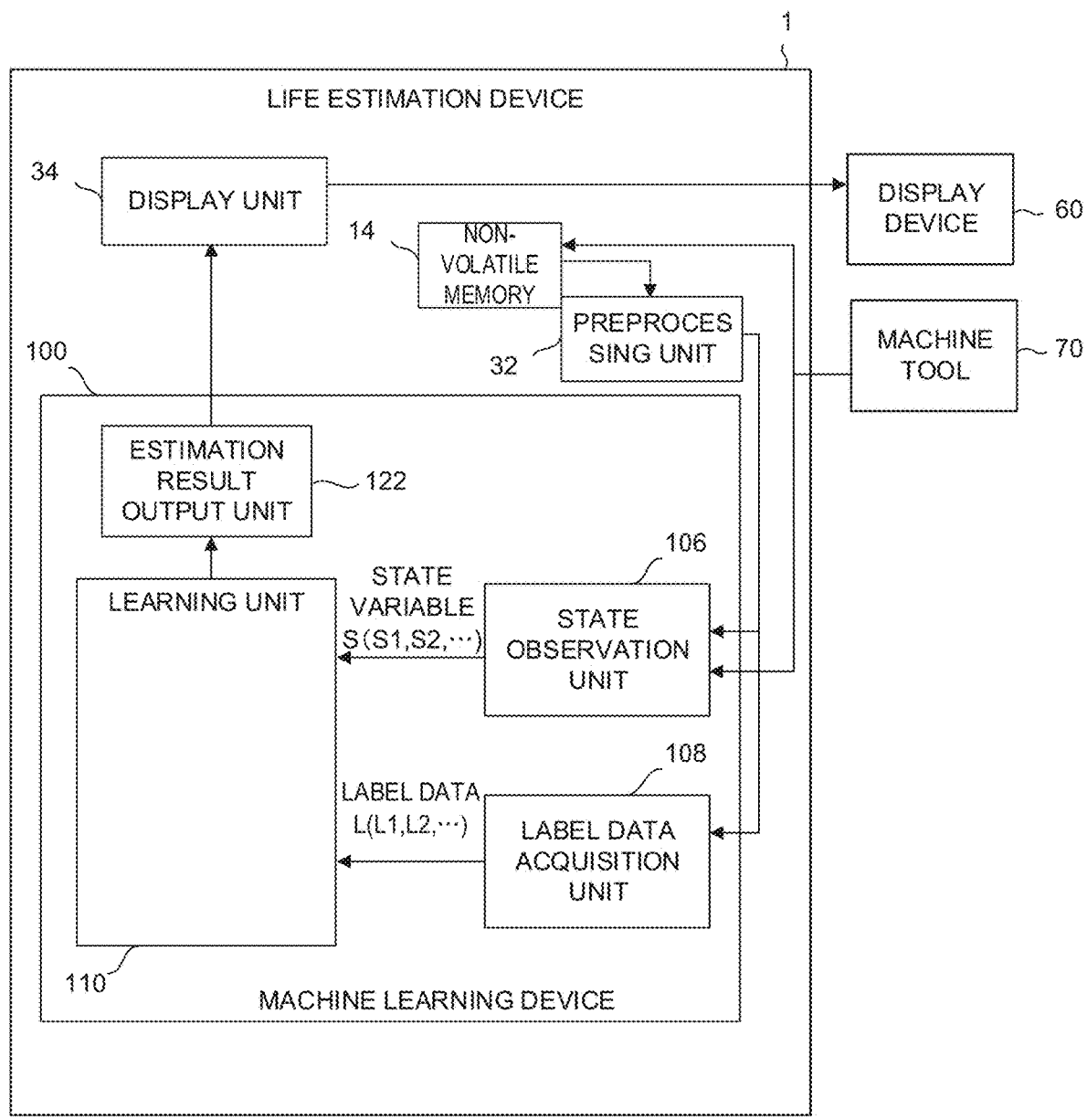
FIG. 2 is a schematic functional block diagram of a life estimation device according to an embodiment.

FIG. 2 is a schematic functional block diagram of the life estimation device 1 and the machine learning device 100 according to the first embodiment.

The respective function blocks illustrated in FIG. 2 are implemented by the CPU 11 incorporated in the life estimation device 1 illustrated in FIG. 1 and the processor 101 of the machine learning device 100 executing their respective system programs and controlling the operations of the individual sections of the life estimation device 1 and the machine learning device 100, respectively.

The life estimation device 1 according to this embodiment includes a preprocessing unit 32 configured to generate data to be used in learning by the machine learning device 100 based on the data on the operating state and the operation history of the rotary table stored in the non-volatile memory 14, and a display unit 34 configured to display on the display device 60 result of estimation of the life of the clamping mechanism of the rotary table output, from the machine learning device 100. The display unit 34 may be configured to display the result of the estimation of the life of the clamping mechanism of the rotary table on the display device 60, for example, when the life of the clamping mechanism of the rotary table output from the machine learning device 100 becomes equal to or shorter than a predetermined time.

The preprocessing unit 32 is configured to generate data used in learning by the machine learning device 100 based on the data on the operating state and the operation history of the rotary table stored in the non-volatile memory 14 (for example, acquired from the machine tool 70 in the past).

Figure 3:
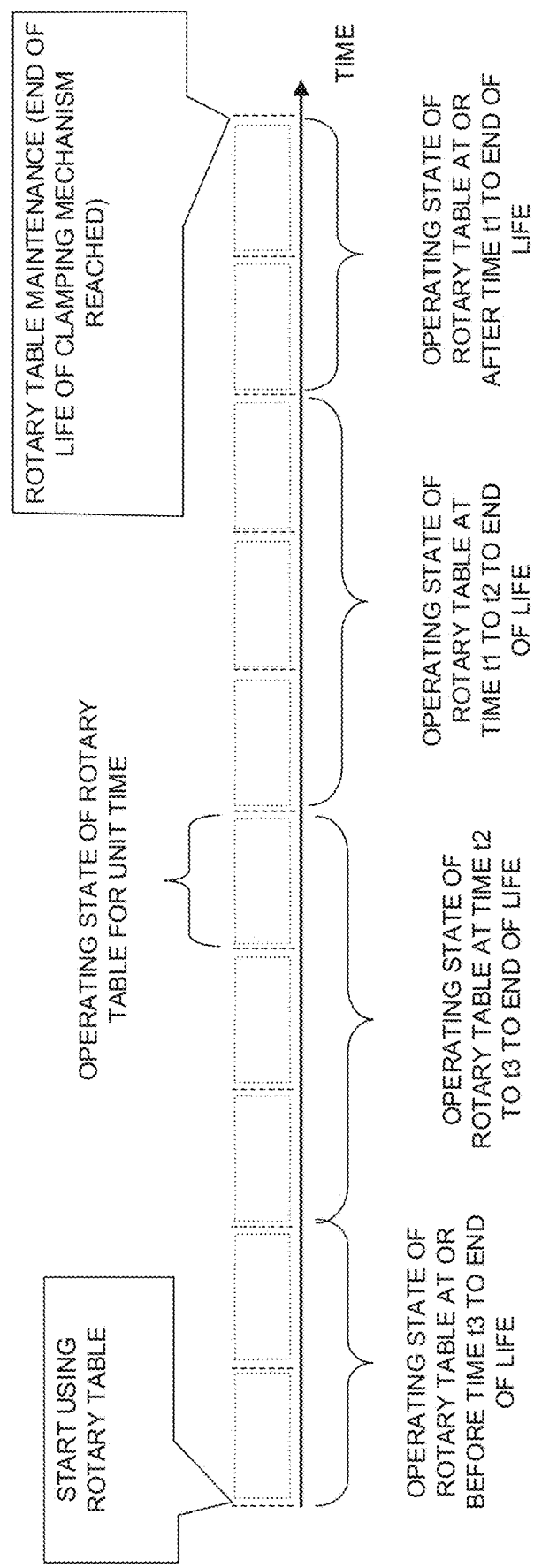
FIG. 3 is a diagram illustrating an example of preprocessing executed by a preprocessing unit.

FIG. 3 is a diagram for explaining an example of preprocessing executed by the preprocessing unit 32. The preprocessing unit 32 collects data on the operating state and the operation history of the rotary table retrospectively starting from the time point at which the clamping mechanism of the rotary table has reached the end of life and maintenance of the rotary table has been carried out (the time point at which the maintenance has been carried out and the content of the maintenance are specified based on the maintenance information that is input via the input device of the machine tool 70, for example, by an operator in charge of the maintenance), sorts the pieces of data thus collected in accordance with the predetermined remaining times before the end of the life (t1, t2, and t3 in FIG. 3), and creates a data set including a pair of the operating state and the operation history of the rotary table and the remaining time before the end of life. In addition, the data set that has thus been created is used in learning by the machine learning device 100.

Meanwhile, the machine learning device 100 incorporated in the life estimation device 1 includes software (learning algorithm, etc.) and hardware (the processor 101, etc.) to autonomously learn the estimation of the life of the clamping mechanism of the rotary table attached to the machine tool 70 with respect to the operating state of the rotary table through so-called machine learning. What is learned by the machine learning device 100 incorporated in the life estimation device 1 corresponds to a model structure that represents correlation between the operating state of the rotary table attached to the machine tool 70 and the life of the clamping mechanism of the rotary table.

As illustrated in the functional blocks in FIG. 2, the machine learning device 100 incorporated in the life estimation device 1 includes a state observation unit 106 configured to observe operating state data S1 indicative of the operating state of the rotary table and operation history data S2 indicative of the operation history of the rotary table, where the pieces of data S1 and S2 are observed as a state variable S representing a current state of an environment; a label data acquisition unit 108 configured to acquire label data L including life data 11 indicative of a life which is a period of time until maintenance of the clamping mechanism of the rotary table becomes necessary; a learning unit 110 configured to carry out learning with the operating state data S1 associated with the operating state of the rotary table and the state of a conveyed object that is being conveyed by a conveying machine, using the state variable S and the label data L; and an estimation result output unit 122 configured to output the life of the rotary table that has been estimated from the operating state, the operation history, or the like of the rotary table, using a learned model that has been learned by the learning unit 110.

At the time of learning by the learning unit 110, the state observation unit 106 acquires the operating state data S1 and the operation his data S2 as the state variable S from the preprocessing unit 32. Further, at the time of estimating the life of the clamping mechanism of the rotary table using the result of learning by the learning unit 110, the state observation unit 106 acquires the operating state data S1 and the operation history data S2 as the state variable S from the machine tool 70.

Of the state variables S observed by the state observation unit 106, the operating state data S1 can be acquired as a set of data related to the operation of the rotary table, for example. The data related to the operation of the rotary table includes, for example, weights of the jig and the workpiece attached to the rotary table, the frequency of clamping/unclamping actions, a source pressure of a pump used in clamping/unclamping the rotary table, a speed of a rotary axis of the rotary table, a load acting on the rotary table, and the like. Various pieces of data corresponding to the respective operation environments of the rotary table can be used as the operating state data S1 as long as they are pieces of data related to the operation of the rotary table. The pieces of data related to the respective operating states included in the operating state data S1 may be, for example, a single numerical value (e.g., a jig weight), or may be a series of values obtained by sampling a value changing over a predetermined period of time at a predetermined cycle (e.g., a load acting on the rotary table).

Of the state variables S, the operation history data S2 can be acquired as a history related to the operation of the rotary table input by the input device (not shown) or acquired from the machine tool 70. The operation history data S2 includes, for example, a cumulative operation time of the rotary table, a cumulative count of the clamping/unclamping actions, and the like. For the operation history data S2, various pieces of data corresponding to the respective operation environments of the rotary table can be used as long as they are a piece of data related to the operation history of the rotary table.

At the time of learning by the learning unit 110, the label data acquisition unit 108 acquires from the preprocessing unit 32, as the label data L, the life data L1 related to the life which is a period of time that will elapse until maintenance of the clamping mechanism of the rotary table becomes necessary. With regard to the life data L1, the remaining time until the life illustrated in FIG. 3 is acquired as the life data L1. The label data acquisition unit 108 is used at the time of learning by the learning unit 110 and it does not need to be an indispensable component of the machine learning device 100 after the learning by the learning unit 110 is completed.

The learning unit 110 learns the label data L (the life data L1 indicative of the life which is a period of time that will elapse by the time when the maintenance of the clamping mechanism of the rotary table becomes necessary) with respect to the state variable S (the operating state data S1 indicative of the operating state of the rotary table and the operation history data S2 indicative of the operation history of the rotary table) in accordance with any one of appropriate learning algorithms generically called machine learning. The learning unit 110 can learn the correlation, for example, between the operating state data S1 and the operation history data S2 included in the state variable S and the life data L1 included in the label data L. The learning unit 110 can iteratively carry out the learning based on the data set including the state variable S and the label data L.

In the learning by the learning unit 110, it is preferable that multiple learning cycles are carried out based on the data obtained from the start of use of a plurality of rotary tables until the clamping mechanism reaches the end of life (as exemplified in FIG. 3, multiple pieces of data for each remaining life can be obtained from the pieces of data obtained until one rotary table reaches its end of life). By repeating such a learning cycle, the learning unit 110 automatically interprets the correlation between the operating state (operating state data S1) of the rotary table and the operation history (operation history data S2) of the rotary table and the life (life data L1) which is the period of time that will elapse until maintenance of the clamping mechanism of the rotary table becomes necessary. At the start of the learning algorithm, the correlation of the life data L1 with respect to the operating state data S1 and the operation history data S2 is substantially unknown. However, as the learning progresses, the learning unit 110 gradually interprets the relationship of the life data L1 with the operating state data S1 and the operation history data S2 and, by using the learned model obtained as a result, it will made possible to interpret the correlation of the life data L1 with respect to the operating state data S1 and the operation history data S2.

Based on the result learned by the learning unit 110 (learned model), the estimation result output unit 122 estimates, from the operating state and the operation history of the rotary table obtained from the machine tool 70, the life of the clamping mechanism of the rotary table attached to the machine tool 70 and outputs the life of the clamping mechanism of the rotary table that has been estimated.

According to the machine learning device 100 having the above-described features, the learning algorithm executed by the learning unit 110 is not limited to a particular one, and a learning algorithm known as machine learning can be adopted.

FIG. 1 illustrates another embodiment of the life estimation device 1 illustrated in FIG. 2, which includes the learning unit 110 that carries out supervised learning as another example of the learning algorithm. Supervised learning is a scheme for learning a correlation model, where a known data set (referred to as teacher data) of an input and an output corresponding to the input is given and, by distinguishing a feature that implies a correlation between the input and the output from the teacher data, and thereby estimating a desired output with respect to a new input.

Figure 4:
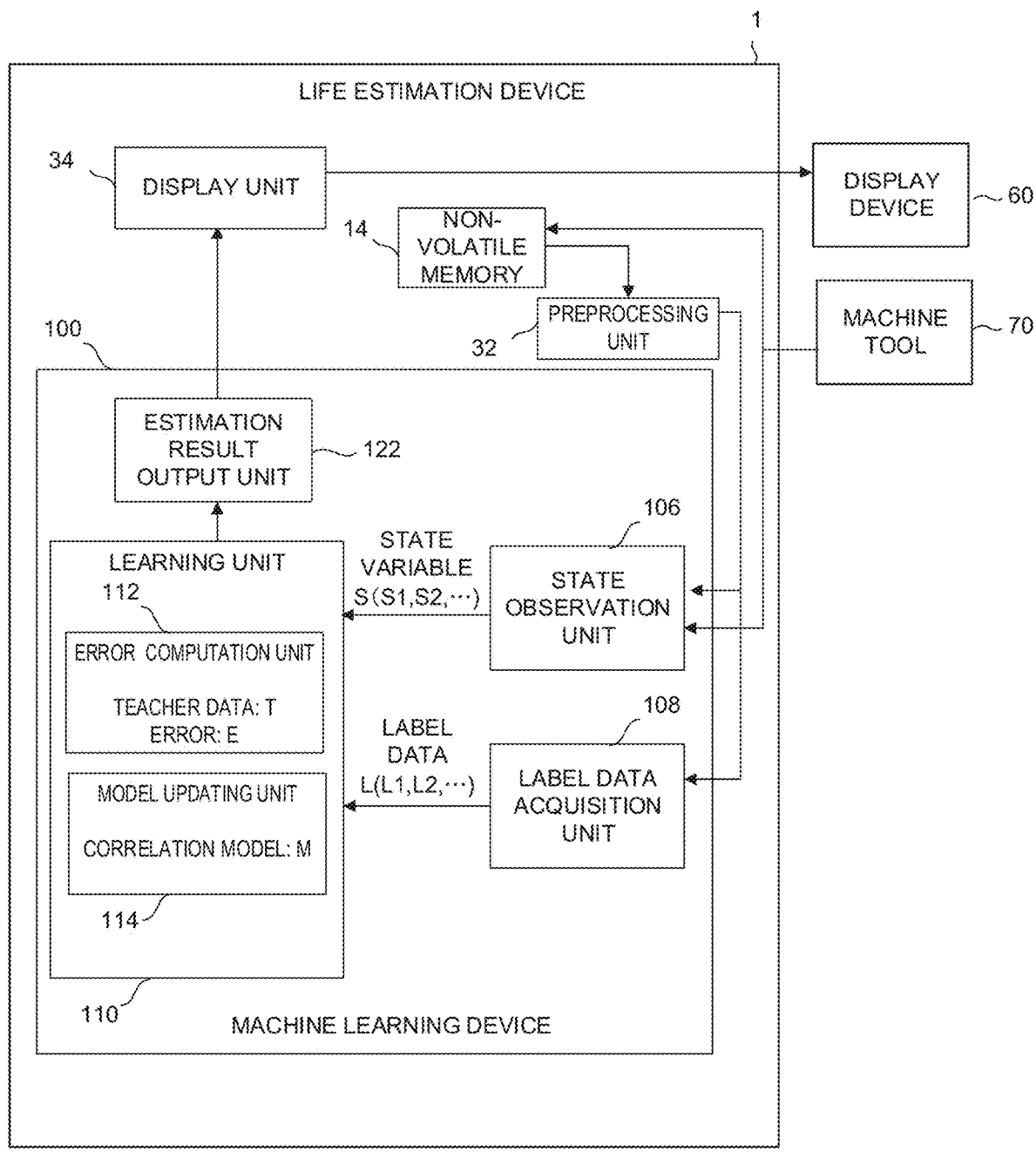
FIG. 4 is a schematic functional block diagram illustrating a mode of the life estimation device.

In the machine learning device 100 of the life estimation device 1 illustrated in FIG. 4, the learning unit 110 includes an error computation unit 112 configured to compute an error E between a correlation model M for estimating the life of the clamping mechanism of the rotary table attached to the machine tool 70 from the operating state and the operation history of the rotary table obtained from the machine tool 70 and a correlation feature identified from the teacher data T obtained from the data of the operation of the rotary table in the past and a result of the maintenance, and a model updating unit 114 configured to update the correlation model M such that the error E is reduced. The learning unit 110 carries out learning of the estimation of the life of the clamping mechanism of the rotary table attached to the machine tool 70 from the operating state and the operation history of the rotary table obtained from the machine tool 70 by the model updating unit 114 repeating updating of the correlation model M.

The initial value of the correlation model M is, for example, expressed by simplifying (for example, by a linear function) the correlation between the state variable S and the label data L, and is given to the learning unit 110 before starting the supervised learning. In the present invention, as described above, the data related to the operation of the rotary table acquired in the past and the information related to the maintenance can be used as the teacher data T, and is given to the learning unit 110 at any time during operation of the life estimation device 1. Based on the teacher data T given at any appropriate time to the learning unit 110, the error computation unit 112 identifies the correlation feature that implies the correlation between the operating state and the operation history of the rotary table obtained from the machine tool 70 and the life of the clamping mechanism of the rotary table attached to the machine tool 70 and obtains the error E between the correlation feature and the correlation model M corresponding to the state variable S and the label data L in the current state. The model updating unit 114 updates the correlation model M so that the error E becomes smaller in accordance with, for example, a predefined update rule.

In the next learning cycle, the error computation unit 112 carries out the estimation of the life of the clamping mechanism of the rotary table using the state variable S in accordance with the updated correlation model M, and obtains the error E between the result of the estimation and the actually acquired label data L, and the model updating unit 114 updates the correlation model M again. In this way, the correlation between the current state of the unknown environment and the estimation thereof will be gradually revealed.

Figure 5A:
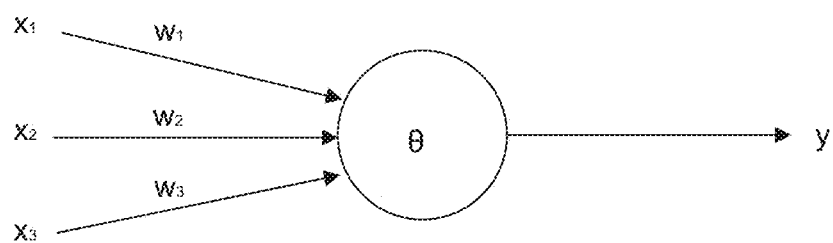
FIG. 5A is a diagram for explaining a neuron.
Figure 5B:
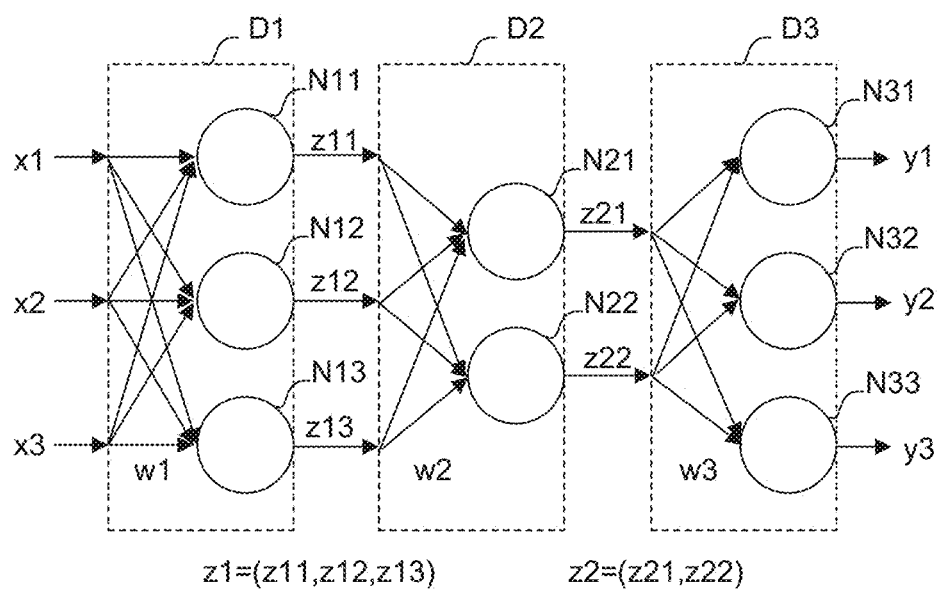
FIG. 5B is a diagram for explaining a neural network.

A neural network can be used when proceeding with the supervised learning described above. FIG. 5A schematically illustrates a model of a neuron. FIG. 5B schematically illustrates a model of a three-layer neural network constructed by combining the neurons illustrated in FIG. 5A. The neural network can be constituted by, for example, an arithmetic unit, a storage unit, etc. imitating the model of the neuron.

The neuron illustrated in FIG. 5A outputs a result in response to multiple inputs x (here, inputs x1 to x3 as an example). Each of the inputs x1 to x3 is multiplied by a weight w corresponding to this input x (w1 to w3, respectively). As a result, the neuron outputs the result y expressed by the following expression (1). In the equation (1), input x, result y and weight w are all vectors. Also, θ is the bias and fk is an activation function.

$$y = f_k(\Sigma_{i=1}^n x_i w_i - \theta) \quad (1)$$

In the three-layer neural network illustrated in FIG. 5B, multiple inputs x (here, inputs x1 to x3 as an example) are input from the left side and a result y (here, results y1 to y3 as an example) is output from the right side. In the illustrated example, each of the inputs x1, x2, and x3 is multiplied by a corresponding weight (collectively represented as w1), and each of the inputs x1, x2, and x3 is input to three neurons N11, N12, and N13.

In FIG. 5B, the outputs of each of the neurons N11 to N13 are collectively represented as z1. The output z1 can be regarded as a feature vector retracting feature amounts of an incoming vector. In the illustrated example, each of the feature vectors z1 is multiplied by a corresponding weight (collectively represented as w2), and the individual feature vectors z1 are input to two neurons N21 and N22. The feature vector z1 represents a feature between the weight W1 and the weight W2.

Further, the outputs of the neurons N21 to N22 are collectively represented as z2. The output z2 can be regarded as a feature vector extracting the feature amount of the feature vector z1. In the illustrated example, each of the feature vectors z2 is multiplied by a corresponding weight (collectively represented as w3), and each of the feature vectors z2 is input to three neurons N31, N32, and N33. The feature vector z2 represents a feature between the weight W2 and the weight W3. Finally, the neurons N31 to N33 output the results y1 to y3, respectively.

It is also possible to use a so-called deep learning scheme using a neural network that has three or more layers.

In the machine learning device 100 incorporated in the life estimation device 1, the learning unit 110 carries out the computation based on the multilayered structure in accordance with the above-described neural network using the state variable S as the input x, and thus the life of the rotary table (result y) can be estimated from the value (input x) of the operating state and the operation history of the rotary table attached to the machine tool 70. Incidentally, the operation modes of the neural network include a learning mode and a value prediction mode. For example, a weight w is learned using a learning data set in a learning mode, and value judgement on a behavior can be made using the learned weight w in the value prediction mode. In the value prediction mode, detection, classification, inference, etc. can also be performed.

The configuration of the machine learning device 100 described above can be described as a machine learning method (or software) executed by the processor 101. The machine learning method is a machine learning method for learning the estimation of the life of the rotary table from the operating state and the operation history of the rotary table attached to the machine tool 70, and the method includes the steps performed by the processor 101 of observing the operating state (operating state data S1) and the operation history (operation history data S2) of the rotary table attached to the machine tool 70 as the state variable S representing the current state, acquiring the life (life data L1) of the rotary table as the label data L, and learning the operating state data S1 and the operation history data S2 and the life of the rotary table in association with each other using the state variable S and the label data L.

The learned model obtained by learning by the learning unit 110 of the machine learning device 100 can be used as a program module which is a part of software related to machine learning. The learned model of the present invention can be used on a computer that includes a processor such as a CPU, a CPU, or the like and a memory. More specifically, the processor of the computer functions such that it carries out the computation using as inputs the operating state and the operation history of the rotary table attached to the machine tool 70 in accordance with an instruction from the learned model stored in the memory, and outputs a result of estimation of the life of the rotary table based on the calculation result. The learned model of the present invention can be used by duplicating it on another computer via an external storage medium, a network, or the like.

In addition, when duplicating the learned model of the present invention on another computer and using it in a new environment, further learning on the learned model may be performed by the other computer based on new state variables and the label data obtained in the new environment. In this case, it is made possible to obtain a learned model (hereinafter referred to as a derivative model) derived from the learned model based on the environment. The derivative model of the present invention is the same as the original learned model in that it outputs the result of the estimation of the life of the rotary table from the operating state and the operation history of the rotary table attached to the machine tool 70 whilst it differs from the original one in that it outputs results that are compatible with the newer environment than the original learned model. This derivative model can also be duplicated and used on other computers via an external storage medium, a network, or the like.

Further, it is also possible to use the output obtained in response to the input to the machine learning device incorporating the learned model of the present invention to create and use a learned model obtained, by learning from scratch in another machine learning device (hereinafter referred to as a distillation model) (this learning process is called distillation). In the distillation, the original learned model is called a teacher model and the newly created distillation model is called a student model. In general, the distillation model is smaller in size than the original learned model, and yet it is more suitable for distributing to other computers via an external storage medium, network, etc. because it can provide the same or equivalent accuracy as the original learned model.

Figure 6:
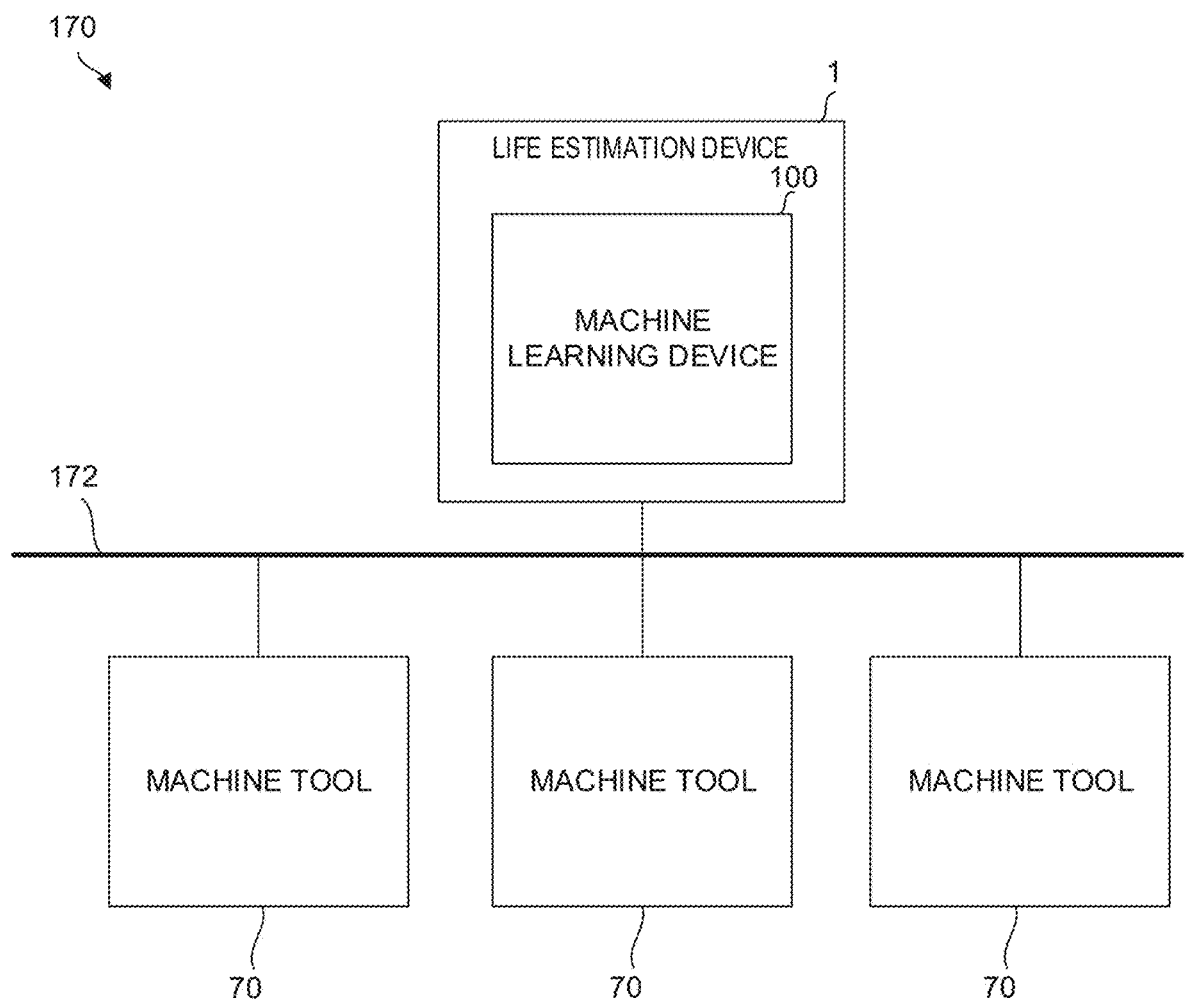
FIG. 6 is a schematic functional block diagram illustrating a mode of a system incorporating the life estimation device.

FIG. 6 illustrates a system 170 according to one embodiment which includes the life estimation device 1.

The system. 170 includes at least one life estimation device 1 mounted as a part of a computer such as a cell computer, a host computer, a cloud server, etc., a plurality of machine tools 70, and a wired/wireless network 172 interconnecting the life estimation device 1 and the machine tool 70.

In accordance with the system 170 having the above-described features, the life estimation device 1 including the machine learning device 100 can automatically and accurately estimate the life of the rotary table in relation to the operating state and the operation history of the rotary table attached to the machine tool 70 using the result of learning by the learning unit 110. Also, the machine learning device 100 of the life estimation device 1 can be configured such that it learns the estimation of the life of the rotary table common to all the machine tools 70 based on the state variable S and the label data L obtained for each of the plurality of machine tools 70 so that the result of the learning can be used by all the machine tools 70. Accordingly, the system 170 makes it possible to improve the speed and reliability of the learning of the life estimation of the rotary table using more various data sets (including the state variable S and the label data L) as inputs.

While the embodiments of the present invention have been described above, the present invention is not limited only to the examples of the above-described embodiments and can be implemented in various modes with modifications made as appropriate thereto.

For example, the learning algorithm and the computation algorithm executed by the machine learning device 100 as well as the algorithm and the like executed by the life estimation device 1 are not limited to those described above, and various algorithms can be adopted.

In addition, although the above embodiment describes the life estimation device 1 and the machine learning device 100 as devices having different CPUs, the machine learning device 100 may be implemented by the CPU 11 incorporated in the life estimation device 1 and a system program stored in the ROM 12.

The invention claimed is:

1. A life estimation device for estimating a life of a clamping mechanism for clamping or unclamping rotation of a rotary table, wherein the life of the clamping mechanism is a period of a time until maintenance of the clamping mechanism becomes necessary, the life estimation device comprising:
 a machine learning device configured to learn estimation of the life of the clamping mechanism with respect to a state of the rotary table, the machine learning device comprising a processor configured to
  observe operating state data regarding an operating state of the rotary table and operation history data regarding an operation history of the rotary table as a state variable indicative of a current state of an environment,
  acquire, as label data, life data indicative of the life of the clamping mechanism,
  learn a correlation between the operating state data and the operation history data and the life data using the state variable and the label data based on a multi-layered structure in accordance with a neural network using the state variable as an input,
  output a result of estimation of the life of the clamping mechanism on a basis of a result of learning, and
  update a correlation model for estimating the life of the clamping mechanism,
 wherein the operating state data include weights of a jig and a workpiece attached to the rotary table, and
 the operation history data include a cumulative operation time of the rotary table.

2. The life estimation device according to claim 1, wherein
 the processor is configured to
  compute an error between the correlation model and a correlation feature identified from teacher data prepared in advance, and update the correlation model such that the error is reduced.

3. The life estimation device according to claim 1, wherein
the processor is configured to perform an operation on the state variable and the label data in accordance with the multi-layer structure.

4. The life estimation device according to 1, wherein the machine learning device resides in a cloud server.

5. The life estimation device according to claim 1, wherein
the processor is configured to
collect the operating state data and the operation history data at a plurality of remaining times until the maintenance of the clamping mechanism, the plurality of remaining times corresponding to the life data,
create a plurality of data sets, each of the plurality of data sets including the operating state data, the operation history data, and a corresponding remaining time among the plurality of remaining times, and
learn the correlation between the operating state data and the operation history data and the corresponding remaining time for each of the plurality of data sets.

6. A machine learning device for learning estimation of a life of a clamping mechanism for clamping or unclamping rotation of a rotary table with respect to a state of the rotary table, wherein the life of the clamping mechanism is a period of a time until maintenance of the clamping mechanism becomes necessary, the machine learning device comprising:
a processor configured to
observe operating state data regarding an operating state of the rotary table and operation history data regarding an operation history of the rotary table as a state variable indicative of a current state of an environment,
acquire, as label data, life data indicative of the life of the clamping mechanism, the life data being acquired, and
learn a correlation between the operating state data and the operation history data and the life data using the state variable and the label data based on a multi-layered structure in accordance with a neural network using the state variable as an input,
output a result of estimation of the life of the clamping mechanism on a basis of a result of learning, and
update a correlation model for estimating the life of the clamping mechanism,
wherein the operating state data include weights of a jig and a workpiece attached to the rotary table, and
the operation history data include a cumulative operation time of the rotary table.

7. The machine learning device according to claim 6, wherein
the processor is configured to
collect the operating state data and the operation history data at a plurality of remaining times until the maintenance of the clamping mechanism, the plurality of remaining times corresponding to the life data,
create a plurality of data sets, each of the plurality of data sets including the operating state data, the operation history data, and a corresponding remaining time among the plurality of remaining times, and
learn the correlation between the operating state data and the operation history data and the corresponding remaining time for each of the plurality of data sets.

* * * * *